United States Patent [19]
Barton

[11] Patent Number: 5,686,675
[45] Date of Patent: Nov. 11, 1997

[54] INSPECTION POINT MARKER

[76] Inventor: David D. Barton, P.O. Box 728, Bellaire, Tex. 77402

[21] Appl. No.: 638,351

[22] Filed: Apr. 26, 1996

[51] Int. Cl.$^6$ .................................................. B29C 47/92
[52] U.S. Cl. ......................................................... 73/866.5
[58] Field of Search ............................. 73/866.5, 622, 73/305 C; 248/542, 543; 374/208

[56] References Cited

U.S. PATENT DOCUMENTS

| | | | |
|---|---|---|---|
| 4,454,370 | 6/1984 | Voznick | 374/208 |
| 5,079,962 | 1/1992 | Peterson, Jr. | 73/866.5 |
| 5,186,050 | 2/1993 | Legale et al. | 73/866.5 |
| 5,311,785 | 5/1994 | Bar Shay | 73/866.5 |
| 5,351,718 | 10/1994 | Barton | |
| 5,382,093 | 1/1995 | Dutches | 374/208 |
| 5,520,220 | 5/1996 | Barton | |
| 5,535,628 | 7/1996 | Rutherford | 73/622 |

*Primary Examiner*—Robert Raevis
*Attorney, Agent, or Firm*—Pravel, Hewitt, Kimball & Krieger

[57] ABSTRACT

A marker is provided for attachment to a pipe or other vessel which periodically requires inspection for wall thickness at a specified, defined position. The marker has minimum surface contact with the pipe to protect against moisture accumulation between them. The marker is attached to the pipe or vessel by an attaching cable which also has reduced or minimum surface contact with the pipe. The marker is provided with a lock mechanism and a protective cover to protect the test area from contact by cleaning substances such as sand during sandblasting, as well as coatings or paints applied after cleaning.

15 Claims, 4 Drawing Sheets

INSPECTION POINT MARKER

BACKGROUND OF INVENTION

1. Field of Invention

The present invention relates to markers attachable to pipes or vessels to indicate and define test locations for inspection purposes.

2. Description of Prior Art

It has become a requirement to periodically inspect pipes or other vessels for wall thickness to comply with environmental and other regulatory schemes. For the test results to be consistent, regulations have required that each successive test be performed within a prescribed minimum distance from all previous tests. The pipes have also been periodically sand-blasted or cleaned, so that mere marking the spot with paint or some similar marking was not adequate. Some form of tag or label is needed for application to the pipe to clearly indicate or designate the inspection test point.

So far as is known, prior test point tags or labels have been flat, thin metal plates which were then bent into a shape conforming to the pipe outer surface. This type of tag was then mounted to the pipe in contact with the pipe over its area of surface extent. However, this structure has permitted the accumulation of moisture between the label surface and the pipe outer wall along the adjoining, co-extensive surfaces. Any such accumulation of moisture was a starting point or source of undesirable corrosion of the pipe, particularly if the pipe were located in a complex where salt water, chemical vapors or the like were present, even if in small amounts.

SUMMARY OF INVENTION

Briefly, the present invention provides a new and improved inspection point marker apparatus for indicating a test point on a vessel for testing purposes. The vessel may be a pipe or other item of equipment, such as in a chemical processing or refining plant. The marker apparatus according to the present invention includes a label member identifying the location of the test point on a surface of the vessel. The label member has an opening formed in it for passage of a test instrument for access to the vessel surface for testing purposes. An example of such a test probe is an ultrasonic probe for measuring vessel wall thickness for environmental monitoring purposes. The label member is provided with a spacer member which maintains the label member out of contact with the vessel surface. This permits the label member of the marker to accurately indicate the test point and yet substantially reduce the possibility of moisture accumulation in the area of the marker. In this way, potential corrosion problems are avoided while protecting against loss or defacement of the designated location for a test point.

DESCRIPTION OF THE PREFERRED EMBODIMENT

Figure 1:
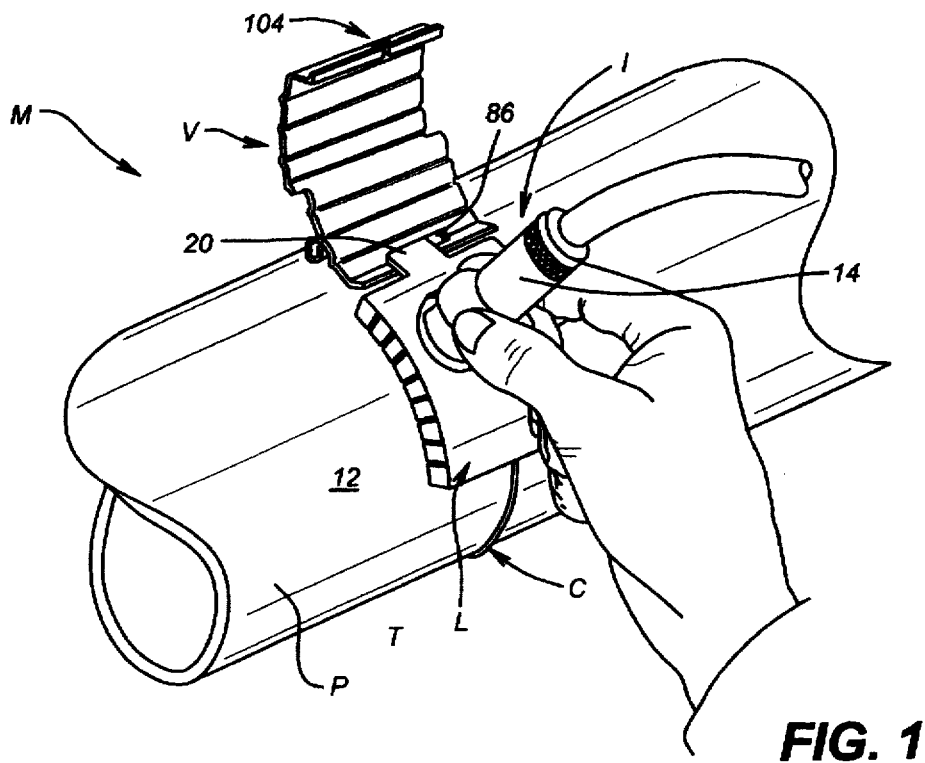
FIG. 1 is an isometric view of an inspection marker apparatus according to the present invention located at a test point during testing.
Figure 2:
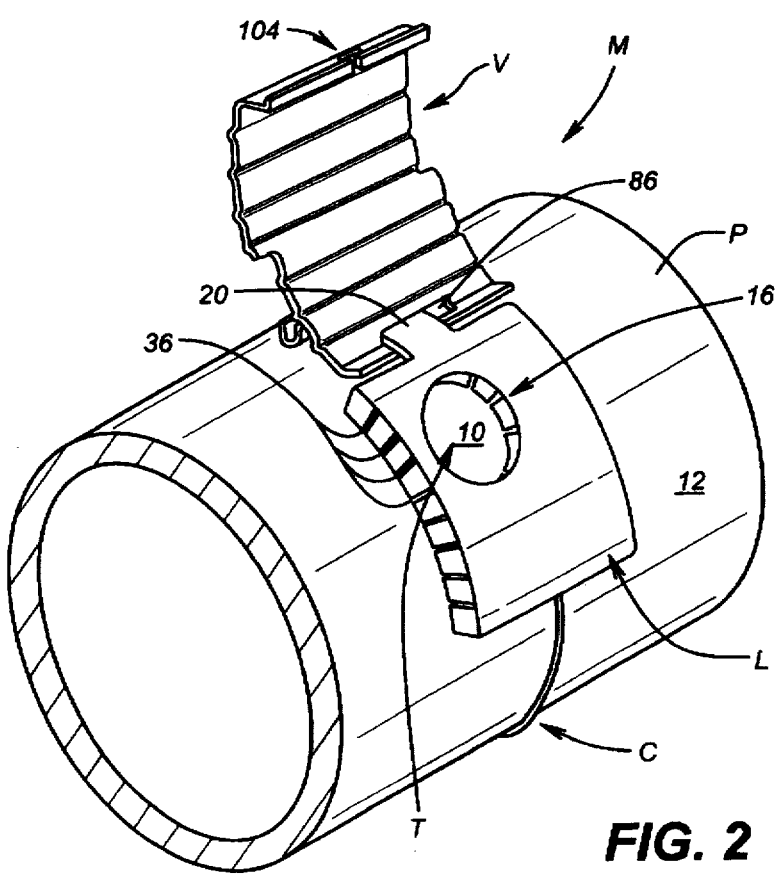
FIG. 2 is an isometric view of the inspection marker apparatus of FIG. 1.

In the drawings, the letter M (FIGS. 1 and 2) designates generally an inspection marker apparatus for indicating a test point T on a pipe or vessel P for testing purposes. The pipe or vessel P may be a pipe, vessel or other item or component of equipment in a chemical processing plant, refinery or the like. The test point T is typically a designated location 10 on an outer surface 12 of the pipe P to which a test instrument I needs to be brought in contact for testing purposes. An example of such a test instrument I is an ultrasonic test probe 14 used to periodically monitor or test wall thickness of the pipe P. It should be understood, however, that other types of test instruments I could also be used, as well. Also, several markers M may be mounted at diametrically spaced positions about the pipe P, if desired.

Figure 4:
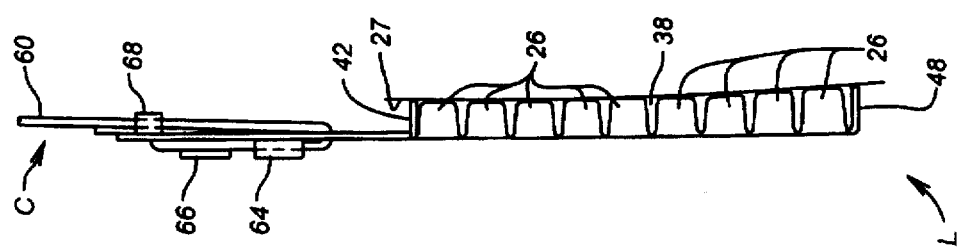
FIG. 4 is a side elevation vie of a label member like that of FIG. 3 after final shaping for installation at a test point.

The inspection point marker M of the present invention includes a label member L which identifies the location 10 of the test point on the surface 12 of the pipe P. The label L has an opening 16 formed in it for passage of the test probe 14 of the test instrument I to the test point 10 for access for testing purposes. The label member L (FIGS. 3 and 4) is a generally rectangular plate 18 of metal or other relatively durable, corrosion resistant material. The plate 18 is preferably stamped from a sheet of such a material. An attachment tab 20 is formed extending outwardly from an upper central portion 22 of the label member plate 18.

The label member L further includes a number of laterally extending spacer fingers 24 and 26 formed extending outwardly from side portion 28 and 30, respectively, of the label member plate 18. The spacer fingers 24 and 26 are preferably integrally formed with the label member plate 18 to extend laterally outwardly therefrom. The spacer fingers 24 and 26 nearer the upper and lower portions of plate 18 are somewhat longer in their outward extent. The fingers 24 and 26 are adapted to be bent or otherwise moved from the position shown in FIG. 3.

After being bent (FIG. 4), the fingers 24 and 26 extend inwardly transversely downwardly from the plate member 18 toward the pipe surface 12. Because of the different extent of fingers 24 and 26 from plate member 18, an arcuate contact surface indicated by a curved line 27 (FIG. 4) of variable curvature is defined at their inner ends. The degree of curvature of the arcuate contact surface 27 can be selectively varied by shaping the curvature of the plate member 18 to conform to the outer surface 12 of the vessel P on which marker M is to be mounted.

Figure 3:
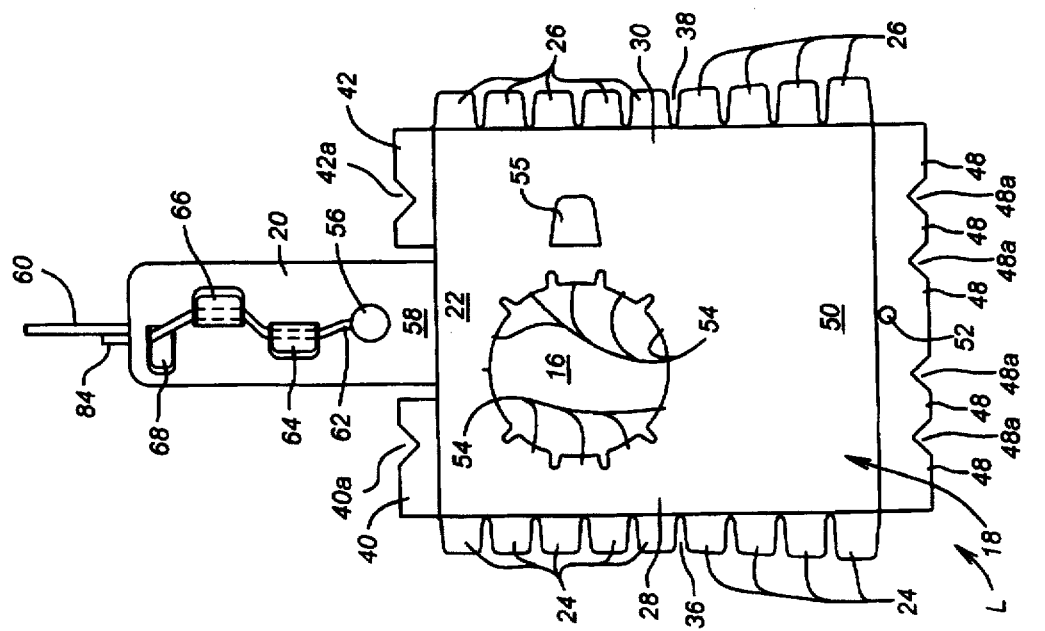
FIG. 3 is a plan view of a label member of the apparatus of FIGS. 1 and 2 before final shaping for installation at a test point like that of FIG. 1.

In this manner, inner ends of the fingers 24 and 26 contact the outer surface 12 of the pipe P, while forming a pocket or space 32 (FIG. 8) between the pipe outer surface 12 and an inner surface 34 of the label member plate 18. Adjacent ones of the spacer fingers 24 and 26 on each side of the label plate member 18 are spaced from each other by notches or grooves as can be seen in FIG. 3. In this manner, when the fingers 24 and 26 are bent inwardly to contact the pipe, the passages or openings are formed by the notches 36 and 38 to allow any fluid which might be present in the space 32 to pass outwardly from beneath the label plate 18. Thus, fluid or vapor accumulation between the label plate 18 and the pipe surface 12 is prevented. It is also preferable that the spacer fingers 24 and 26 have their inner end portions which contact the pipe surface 12 made relatively thin, to minimize the area of surface contact between the fingers 24 and 26 and the pipe surface 12. In this manner, the amount of surface contact of the label member plate 18 and the pipe P is kept at a minimum to reduce the area of potential moisture accumulation.

The label member L also includes upper spacer fingers 40 and 42 formed extending outwardly from the upper central portion 22 on each side of the attachment tab 20. The upper spacer fingers 40 and 42 are preferably integrally formed with the label member plate 18 and are also adapted to be bent or otherwise made to extend transversely downwardly from the label member Plate 18 toward the pipe surface 12. The upper spacer fingers 40 and 42 also have passages 40a and 42a, respectively, formed therein to minimize surface contact of fingers 40 and 42 and also serve as vapor exit passages and to further reduce any tendency of vapor or moisture accumulation within the space 32.

The label plate member 18 also includes a suitable number of lower spacer fingers 48 extending outwardly from a lower edge portion 50. The lower spacer fingers 48 are preferably integrally formed with the label plate member 18 and are adapted to be bent or otherwise made to extend transversely downwardly from the label plate member 18 toward the pipe surface 12. Passages 48a for vapor or fluid exit are formed in the lower spacer fingers 48 to serve as vapor or fluid exit passages to reduce any tendency of vapor or fluid accumulation within the space 30.

An attachment cord opening or port 52 is formed in a central or middle spacer finger 48 for passage of a connector cord C for mounting the marker label M on the pipe P, as will be set forth. If it is not necessary for the marker label M to be removably mounted, it may be fixedly attached by welding studs or the like. Also, if atmospheric moisture or vapor is not a factor, silicone or some other suitable adhesive may be injected into the space 32 to serve as an adhesive for attachment either with, or instead of, the cord C, as desired.

A number of radially extending spacer fingers 54 are formed in the label plate member 18 about the outer periphery of the opening 16. The fingers 54 are also preferably integrally formed with the label plate member 18 and are adapted to be moved to extend inwardly by bending or otherwise transversely downwardly from the label plate member 18 toward the pipe surface 12. A number of radially extending notches or passages are formed between adjacent ones of the fingers 54 to serve as vapor or fluid exit passages and also again reduce any tendency of vapor or fluid accumulation within the space 30 beneath the label member plate 18. A guide tab or lug 55 is formed extending downwardly in the plate member 18 into the space 32 to serve as a guide for passage of the cord C away from the opening 16 when several markers M are attached about the vessel P at diametrically spaced positions, as will be set forth.

Considering again the attachment tab 20, a circular connector port 56 is formed in an inner portion 58 thereof adjacent the upper central portion 22 of the label member plate 18. The connector port 56 is adapted to receive a first or open upper end portion 60 of the connector cord C for passage therethrough. A retainer notch or slot 62 is formed extending radially outwardly from the connector port 56. The restraining notch 62 is of a size adapted for the connector cord C to be received and retentively fitted therein.

A pair of oppositely facing raised guide lance members 64 and 66 are formed by stamping or other suitable techniques in the attachment tab 20 outwardly from the connector port 56. The guide lance member 64 and 66 are in the form of inverted "L" shaped guides about which the upper or free end portion 60 of the connector cord C is passed to mount the label M onto the pipe P. The lance members 64 and 66 face oppositely so that portions of the connector cord C may be wrapped thereabout in attaching the marker M to the pipe P, as will be set forth.

An inwardly extending attachment stirrup or cleat 68 is formed by stamping or otherwise in the attachment tab 20 outwardly from the guide lance members 64 and 66. The attachment stirrup 68 is generally "U" shaped and extends outwardly below the attachment tab 20 in an opposite direction from the lance members 64 and 66.

Figure 7:
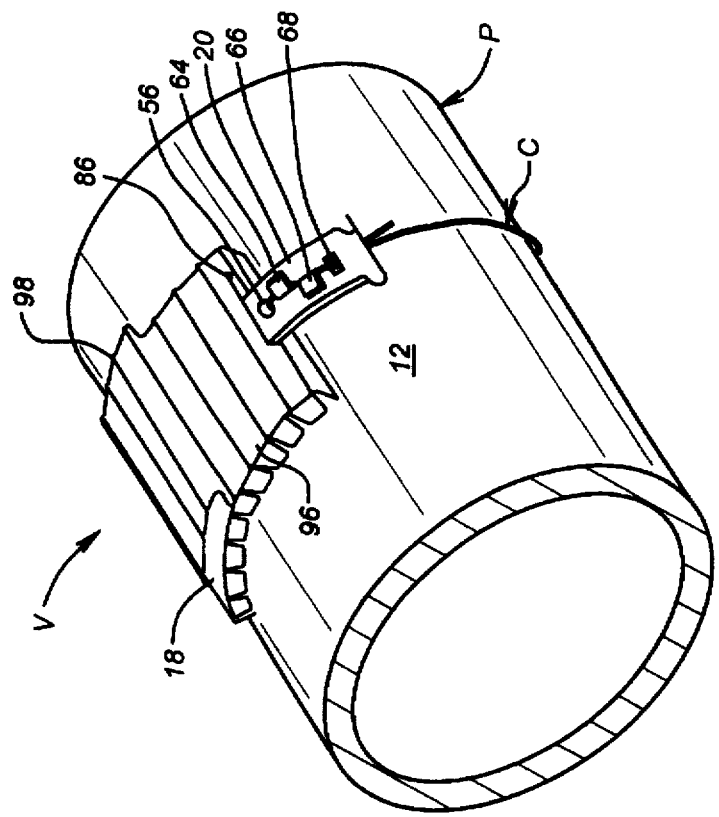
FIGS. 6 and 7 are isometric views of the apparatus of FIGS. 1 and 2, taken from an opposite rear position, illustrating attachment of the apparatus to a vessel.
Figure 6:
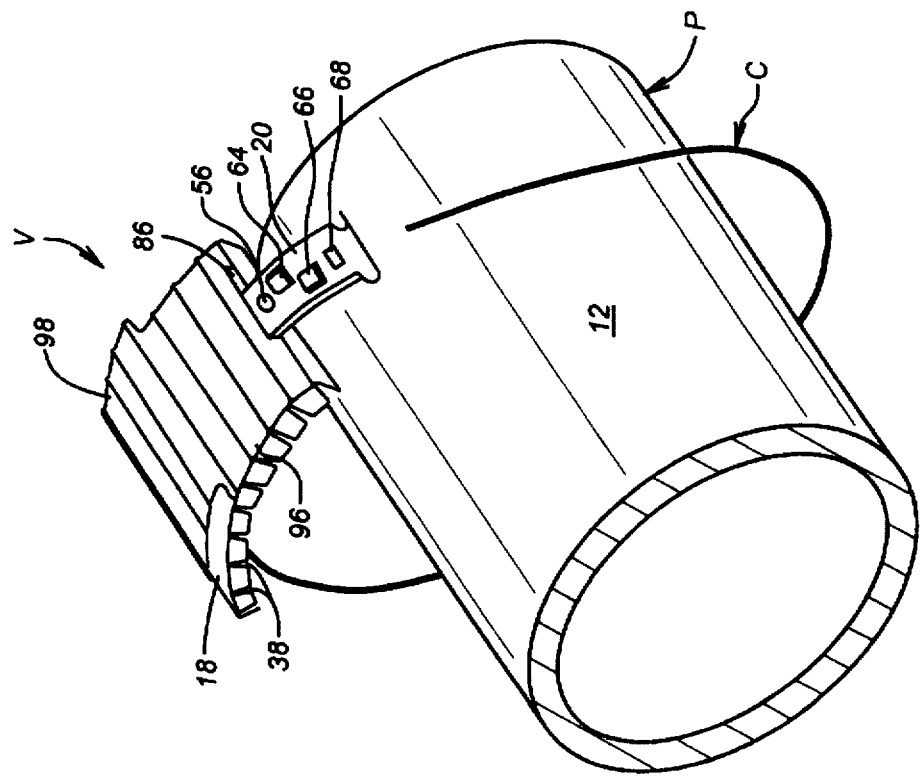
Figure 8:
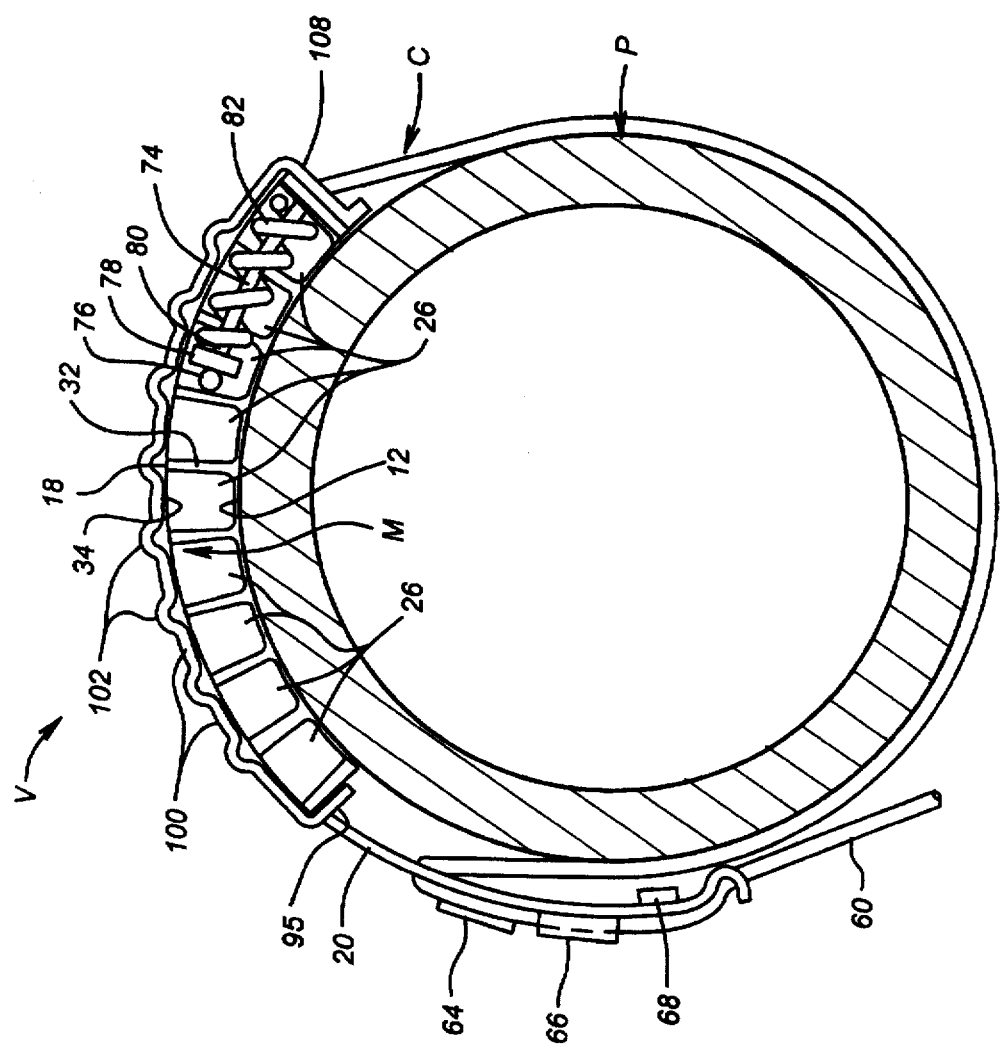
FIG. 8 is an elevation view, taken partly in cross-section, of the apparatus of FIGS. 1 and 2.

The connector cord C is preferably a multistrand cable of stainless steel which extends from its first or free upper end portion 60 a suitable length for passage around the pipe or vessel P (FIGS. 6 and 7) to a second or fixed lower end portions 74 (FIG. 8). The second end portion 74 extends through the passage 50 formed in the central lower spacer finger 46. The lower end 74 of the connector cord C is attached by a knot 76 (FIG. 8) at a stop plate 78 mounted at an outer end 80 of a resilient spring 82 of steel or other suitable material. The spring 82 is located within the space 32 below plate member 18 to exert a tensile force on the cord or cable C and holds marker M firmly in place. The cable C is of reduced surface contact area with the pipe surface 12 as contrasted to flat bands or straps. The fixed cord end 74 extends within and along a longitudinal axis of the spring 82 and is thus held under a resilient, retentive force exerted by the spring 82 between the fixed end 74 and the open or free upper end 60.

The upper end 60 (FIGS. 3 and 4) of the connector cord C is connected to the attachment tab 20 by inserting a head or leader portion 84 initially through the attachment stirrup 68. The cord leader portion 84 is then passed beneath the attachment tab 20 and through a connector port 56 outwardly. The head end 84 of the connector cord C is then fitted into the retainer notch 62 adjacent the connector port 56. The header portion 84 is then wound past the guide lance member 64 and 66, respectively and pulled taut against the resilient force exerted by the spring 82. The cord C is thus fixed in place under tension of the spring 82. The leader portion 84 is then fitted in place and secured between the attachment stirrup 68 and the tab 20.

Figure 5:
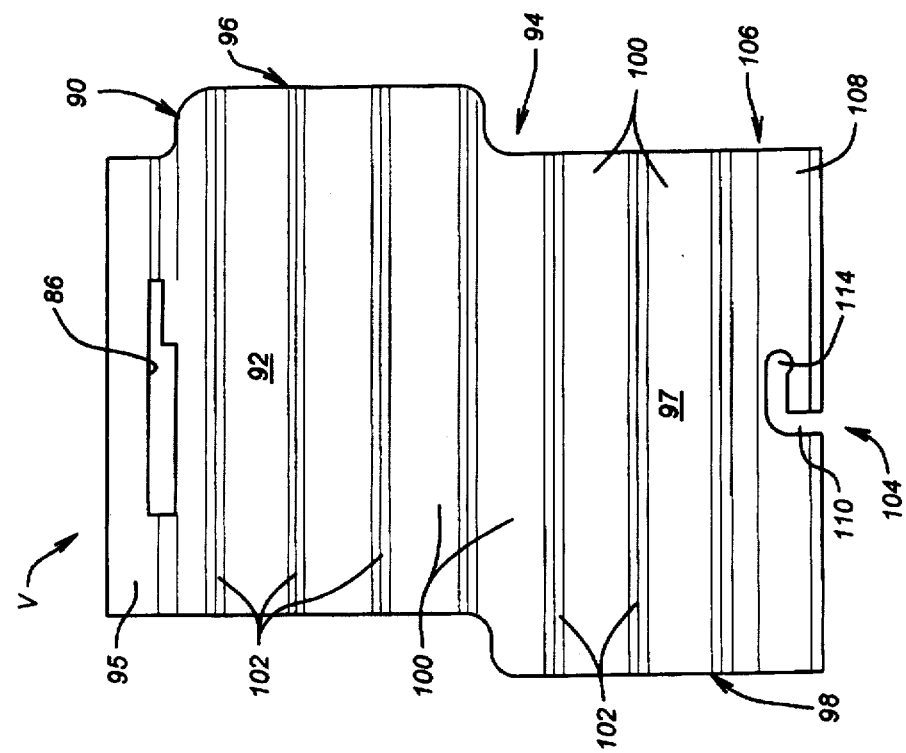
FIG. 5 is a plan view of a cover plate member of the apparatus of FIGS. 1 and 2 before final shaping for installation at a test point.

The marker apparatus M of the present invention also preferably includes a cover plate member V (FIG. 5) which is removably mounted with the label member L for covering the label plate 18 and the opening 16 therein to protect the test point T from exposure. The cover plate V is normally locked in place, in a manner to be set forth, to protect the test point from cleaning substances such as sand used in sandblasting, paint or coatings applied after cleaning, and from adverse weather or atmospheric conditions.

Considering the cover plate member V more in detail, a laterally extending connector slot 86 is formed near a juncture 90 between an upper portion 92 of a cover plate 94 and an end wall 95. The connector slot 86 is adapted to receive and fit over the attachment tab 20 of the label plate 18. The end wall 95 is also bent downwardly to extend inwardly toward the pipe P. The cover plate V can then be slid downwardly and pivoted to hingedly fit in place and cover the label plate member 18.

The connector slot 86 is wider in its lateral extent than the attachment tab 20, for reasons to be set forth. The cover plate 94 preferably has laterally extending gripping tab members 96 and 98 formed extending outwardly therefrom. The gripping tab members 96 and 98 permit a test technician to grasp the cover plate V and slide it laterally with respect to the label plate member 18 to unlock the marker M for access to the test point T through the opening 16, as will be set forth.

The cover plate 94 is preferably formed of a number of ribbed plate sections or segments 100 and interconnected, foldable ribs 102. The cover plate 94 is preferably formed of a similar material to the label plate 18, with the ribs or folds 102 formed therein by stamping or other suitable manufacturing techniques. In this manner, the cover plate V may be bent into a matching curved shape to that of the plate member 18 conforming to the pipe outer surface. The label plate 18 is thus adapted to be bent into an arcuate or curved shape fitted onto a curved surface, such as the outer surface 12 of the pipe P. The ribs or folds 102 in the cover plate 94 permit the cover plate 94 to be bent or shaped into a mating, concentric curved surface over the label plate 18.

The lower portion 97 of cover plate 94 also includes a lock mechanism 104 formed adjacent a junction 106 of the cover plate 94 and a downwardly extending end wall 108. The lock mechanism 104 includes an inwardly extending inlet slot 110 into which a portion 112 of the connector cord C adjacent the fixed end 74 may be passed. The lock mechanism 104 also includes a laterally extending lock slot 114 extending transversely to the inlet slot 110. The laterally extending slot 114 is adapted to receive the cord portion 112 after insertion therein when the cover plate V is fitted over the label plate 18.

It is to be noted that the connector slot 86 in the cover plate V is wider in lateral extent than the width of the attachment tab 20. This permits the lateral movement of the cover plate V with respect to the marker plate M when the cover plate V is engaged at gripping tabs 96 and 98 to slide the cover plate V laterally with respect to the label marker plate 18 for locking and unlocking purposes.

When the marker M is attached to the pipe P and the connector cord C holding plate member 18 in place under tension of spring 82, the cover plate V is then folded downwardly to cover the opening 16. The cord C is then fitted into the inlet slot 110 and moved inwardly. The gripping tab 98 is gripped and the cover plate V slid laterally, usually until the edge of tab 98 is aligned with the side fingers 26. This action moves the cord C laterally into the lock slot 114 to lock the cover plate V down in place on plate member 18 covering the opening 16. Because the slot 96 is wider than attachment tab 20, this lateral movement of the cover plate V with respect to tab 20 can occur. Gripping tab 98 thus functions as a locking tab.

To unlock the cover plate V, the tab 96 is gripped and moved laterally in a reverse direction, preferably until the edge of tab 96 is aligned with the side fingers 24. Again, the width of slot 86 permits cover plate V to move with respect to tab 20. As a result of lateral movement by force exerted on tab 96, the cord C is now aligned with inlet slot 110 and the cover plate V is unlocked.

As has been set forth, two or more of the plate members M may be located on the pipe P at diametrically spaced locations. This is done using a single cord C as an attachment mechanism. In these cases, the cord C passes through the space 32 below plate 18, with the guide tab 55 restraining the cord C, keeping it from being located in the opening 16.

Having described the invention above, various modifications of the techniques, procedures, material and equipment will be apparent to those in the art. It is intended that all such variations within the scope and spirit of the appended claims be embraced thereby.

I claim:

1. An inspection point marker apparatus for indicating a test point on a vessel for testing purposes, comprising
    a label plate member having an opening formed in it for passage of a test instrument to the test point and identifying the location of the test point on a surface of the vessel;
    a cover plate member mounted with said label plate member for covering said label plate member opening to protect the test point;
    said cover plate member being movable with respect to said label plate member for access to the test point;
    a connector for mounting said label plate member on the vessel;
    spacer members formed on said label plate member extending inwardly from said label plate member toward the vessel and having end portions making point contact with the vessel surface for maintaining said label plate member out of contact with the vessel surface.

2. The apparatus of claim 1, wherein:
    said spacer members are integrally formed with said label plate member.

3. The apparatus of claim 1, wherein:
    said cover plate member is pivotally mounted to said label plate member.

4. The apparatus of claim 1, further including:
    a gripping tab member formed on said cover plate member to permit gripping thereof.

5. The apparatus of claim 1, further including:
    a plurality of side gripping tab members formed on said cover plate member to permit gripping thereof.

6. The apparatus of claim 1, wherein:
    said connector comprises a cable attached to said label plate member and extending about a portion of the vessel adjacent the test point.

7. The apparatus of claim 6, further including:
    a resilient mechanism exerting a retentive force on said cable.

8. The apparatus of claim 6, further including:
    a locking mechanism for locking said cover plate member to said cable.

9. An inspection point marker apparatus for indicating a test point on a vessel for testing purposes, comprising
    a label plate member having an opening formed in it for passage of a test instrument to the test point and identifying the location of the test point on a surface of the vessel;
    a cover plate member mounted with said label plate member for covering said label plate member opening to protect the test point;
    said cover plate member being movable with respect to said label plate member for access to the test point;
    a locking mechanism for locking said cover plate member in position covering said label plate member opening;
    a connector for mounting said label plate member on the vessel; and
    spacer members formed on said label plate member extending inwardly from said label plate member toward the vessel for maintaining said label plate member out of contact with the vessel surface.

10. The apparatus of claim 9, wherein said locking mechanism is unlocked by lateral movement of said cover plate member, and further including:

a gripping tab member formed on said cover plate member to permit gripping and lateral movement thereof.

11. An inspection point marker apparatus for indicating a test point on a vessel for testing purposes, comprising
- a label plate member having an opening formed in it for passage of a test instrument to the test point and identifying the location of the test point on a surface of the vessel;
- a cover plate member mounted with said label plate member for covering said label plate member opening to protect the test point;
- said cover plate member being movable with respect to said label plate member for access to the test point;
- said cover plate member being pivotally mounted to said label plate member for access to said test opening;
- a connector for mounting said label plate member on the vessel; and
- spacer members formed on said label plate member extending inwardly from said label plate member toward the vessel for maintaining said label plate member out of contact with the vessel surface.

12. The apparatus of claim 11, further including:
- a locking mechanism for locking said cover plate member in position covering said label plate member opening.

13. The apparatus of claim 12, wherein said locking mechanism is unlocked by lateral movement of said cover plate member, and further including:
- a gripping tab member formed on said cover plate member to permit gripping and lateral movement thereof.

14. An inspection point marker apparatus for indicating a test point for testing purposes on a vessel having a curved wall, comprising:
- a label member identifying the location of the test point on a curved surface of the vessel wall;
- said label member being curved to conform to the vessel wall;
- said label member having an opening formed in it for passage of a test instrument to the test point; and
- a ribbed cover plate member removably mounted with said label member for covering said label opening to protect the test point;
- spacer members formed on said label member extending therefrom for maintaining said label member out of contact with the vessel surface.

15. The apparatus of claim 14, wherein:
- said ribbed plate member is composed of interconnected and foldable ribbed segments to allow adjustability for curvature of the plate member.

* * * * *